Jan. 12, 1971 R. E. VOSTEEN 3,555,435
MULTIFREQUENCY SIGNAL DETECTOR
Filed Nov. 21, 1968
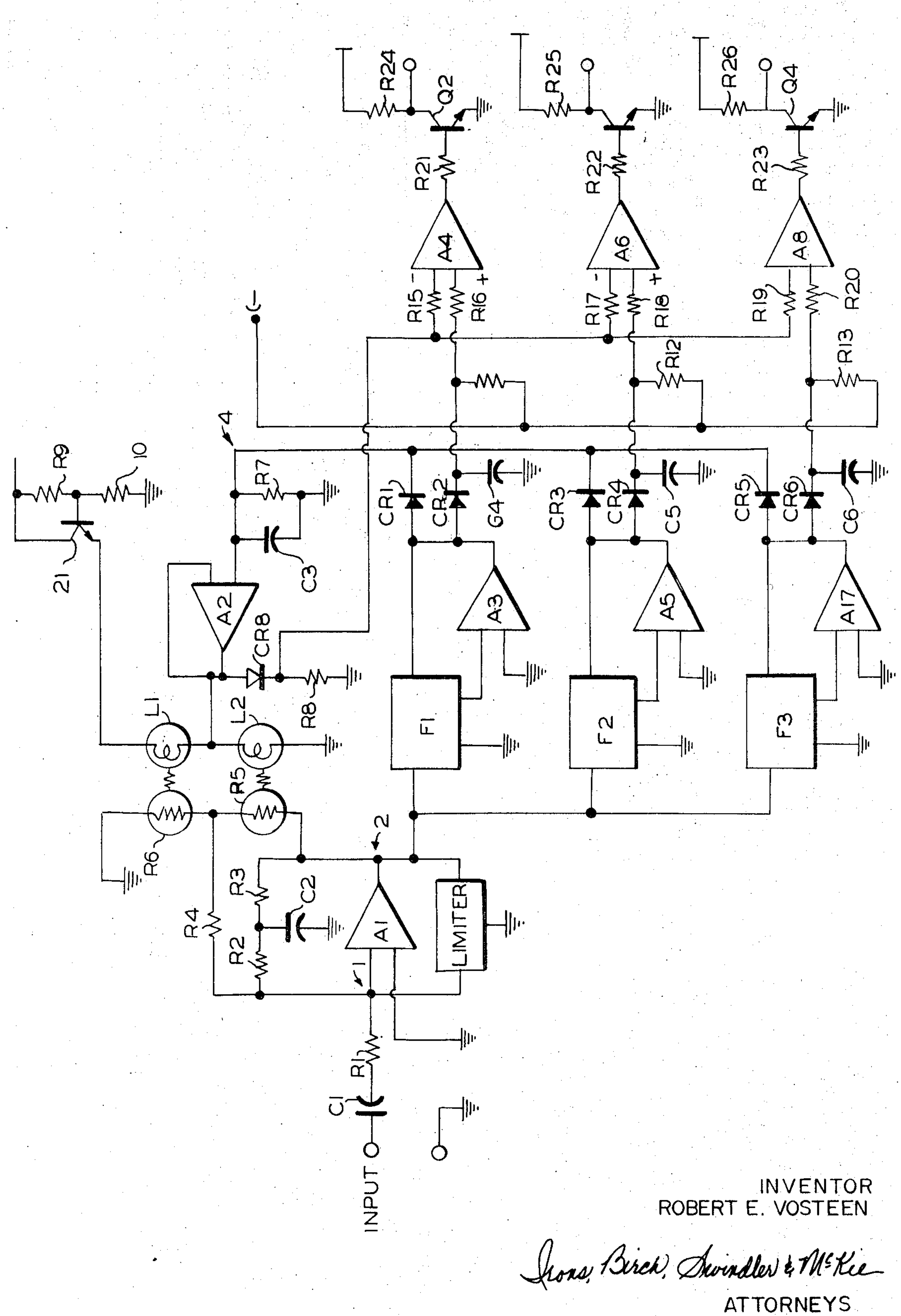
INVENTOR
ROBERT E. VOSTEEN
Irons, Birch, Swindler & McKie
ATTORNEYS

United States Patent Office 3,555,435

Patented Jan. 12, 1971

3,555,435

MULTIFREQUENCY SIGNAL DETECTOR

Robert E. Vosteen, 315 W. Center St., Medina, N.Y. 14103

Filed Nov. 21, 1968, Ser. No. 777,858

Int. Cl. H03k *5/20*

U.S. Cl. 328—140 14 Claims

ABSTRACT OF THE DISCLOSURE

A multifrequency signal detector to selectively distinguish signals of different predetermined frequencies. The input signal to the detector is applied to an operational amplifier, the output of which commonly feeds a plurality of filter-amplifier means corresponding in number to that of the different frequencies to be selectively distinguished. A peak voltage output is produced by that filter-amplifier means which receives signals of the frequency selected to be detected. Feedback means including a voltage follower are connected between the outputs of the filter-amplifier means and the operational amplifier. Switch means that may comprise transistors are also connected to the outputs of the filter-amplifier means to indicate reception of frequencies selected to be detected.

BACKGROUND OF THE INVENTION

Field of the invention

The invention relates to multifrequency signal detecting means which distinguish one or a plurality of signals of different frequencies. It has particular utility, for example, in telephony and radio communication systems.

Description of the prior art

Numerous prior art circuits are provided for encoding and decoding multifrequency signals based upon the transmission on one or more discrete frequencies through communication systems such as telephony or radio. Such a decoder, in order to be practically useful, must be able to accept a wide range of input amplitudes, and a wide range of input amplitude ratios in the event that multiple simultaneous signals are applied. Further, the decoder must have a reasonable and acceptable range of frequency instability while still providing reliable decoding of applied signals.

A common multifrequency system employs two distinct frequencies for identifying individual digits. This type of system is in common use in telephone systems and functions to transmit the two different frequencies upon actuation of switches corresponding to the digit to be transmitted. In this type of system, the following shows the frequencies of tone pairs of corresponding to each digit:

| Digit— | Tone pairs (Hz.) |
|---|---|
| 1 | 697+1209 |
| 2 | 697+1336 |
| 3 | 697+1477 |
| 4 | 770+1209 |
| 5 | 770+1336 |
| 6 | 770+1477 |
| 7 | 852+1209 |
| 8 | 852+1336 |
| 9 | 852+1477 |
| 0 | 941+1336 |

Analysis of the above table shows a matrix consisting of four lower frequency tones (697, 770, 852, and 941 Hz.) and three upper frequency tones (1209, 1336 and 1477 Hz.) which, in selected combinations, identify particular ones of ten digits (0 through 9). Larger matrices consisting of more than four lower frequency tones and three upper frequency tones may be employed and the use of less than two tones to identify individual digits are also possible. However, it has been found that the use of two tones to identify individual digits is adequate for voice communication systems since it is difficult to orally synthesize two simultaneously constant frequency tones consisting of relatively widely different and nonharmonically related frequencies.

SUMMARY OF THE INVENTION

The invention is therefore advantageous for use in the detection of multifrequency signals. It employs an inverting amplifier which functions as a wide-band amplifier in the input to the detector. This amplifier comprises a feedback circuit to provide an adequately low D.C. resistance to insure stability of its D.C. operating point while acting as a high effective input impedance at any operating frequency, thereby insuring no significant gain limitation. A limiter circuit is also associated with the inverting amplifier to limit the output thereof during the initial signal transient to minimize false initial detector output signals.

A plurality of tuned amplifiers, each being capable of detecting different frequencies, are connected to the output of the amplifier. The amplifier produces an output signal having a peak voltage at the selected frequency to be detected. A voltage follower is connected to the outputs of the plurality of tuned amplifiers and drives associated AGC feedback lamps.

AGC feedback is achieved by employing light dependent resistors in the inverting amplifier circuit which are responsive to the feedback lamps. The described combination of lamps are associated with light dependent resistors in the feedback circuit.

The outputs of the tuned amplifiers are also connected to one input of associated comparison amplifiers functioning as differential operational amplifiers. Additionally, the output of the voltage follower is connected to a second input of each of the comparison amplifiers. The latter function to produce an output signal in response to reception of signals at the frequency selected to be detected to activate corresponding switch means connected thereto and provide an indication of reception of signals at the frequency selected to be detected.

BRIEF DESCRIPTION OF THE DRAWINGS

The figure shows an electrical schematic diagram of the multifrequency decoder according to the invention.

DETAILED DESCRIPTION OF THE INVENTION

The multifrequency decoder according to the invention is particularly advantageous because it provides a relatively inexpensive and reliable decoder to decode signals of a two tone system. The figure shows amplifier A1 which comprises an inverting amplifier functioning as a wide-band linear AGC (automatic gain control) amplifier. The series connection of capacitor C1 and resistor R1 is connected in the input circuit of amplifier A1 and C–1 functions to block any D.C. component of the input to amplifier A1.

Resistors R2 and R3 are connected in series between summing junction 1 and output 2 of amplifier A1. The series connection of resistors R2 and R3 is bypassed to ground through capacitor C2. The feedback connection comprises a T network of resistors R2 and R3 and capacitor C2. It provides an adequately low D.C. impedance to insure stability of the D.C. operating point of amplifier A1 and functions as a high effective feedback impedance at any operating frequency. This precludes significant gain limitation that might otherwise result from using this network.

The gain determining feedback network comprises resistors R4, R5 and R6 connected as a second T network in the feedback circuit of amplifier A1. Thus, resistors R4 and R5 are connected in series between summing junction 1 and output 2 of amplifier A1, and the series connection of resistors R4 and R5 is connected to ground through resistor R6. Resistors R5 and R6 comprise light dependent resistors (LDR) that will be described in detail hereafter.

A limiter network 3 is also connected in the feedback circuit of amplifier A1 between summing junction 1 and output 2. It may, or example, comprise a double Zener diode connected between summing junction 1 and output 3, although other equivalent types of networks may be substituted therefor. The function of limiter 3 is to limit the output of amplifier A1 during the initial signal transient in order to minimize false initial output signals from the decoder. The amplifier normally functions in the linear mode in the steady-state condition.

The output of amplifier A1 is connected to the input of three tuned amplifiers, A3, A5 and A7. The latter amplifiers are similar except that their associated filter networks F1, F2 and F3 are tuned to pass different selected frequencies, $f_1$, $f_2$ and $f_3$, respectively. Amplifiers A3, A5 and A7 function to produce an output voltage signal that is peaked at the corresponding selected tuned frequency. Filters F1, F2 and F3 may comprise conventional RC or LC networks that are well-known in the art. The gain of amplifiers A3, A5 and A7 is not overly critical but is chosen to be substantially equal for the three amplifiers.

Three filter-amplifier networks have been shown for illustrative purposes only. The invention is not limited to the use of only three such networks. Rather more or less than three frequencies $f_1$–$f_3$ may readily be detected through use of a corresponding number of filter-amplifier networks according to the invention.

Diodes CR1, CR3 and CR5 are respectively connected between the outputs of tuned amplifiers A3, A5 and A7 to capacitor C3 and resistor R7 through common connection 4. As shown, capacitor C3 and resistor R7 are connected in parallel between the input of voltage follower amplifier A2 and ground. Capacitor C3 comprises a peak holding capacitor and resistor R7 provides a long time constant discharge path therefor. Thus the voltage developed across capacitor C3 is the maximum peak output voltage produced by any of tuned amplifiers A3, A5 or A7, less its associated diode (CR1, CR3, or CR5) voltage drop. The diodes shown in the figures are matched to insure identical voltage drops at a given forward current to provide forward drop tracking with temperature variations.

The voltage developed across capacitor C3 is applied to amplifier A2 which comprises an operational amplifier connected to function as a high input resistance voltage follower. The output of amplifier A2 drives the AGC feedback lamps L1 and L2 as will be described hereafter and provides the maximum peak output voltage of any of tuned amplifiers A3, A5 or A7, less two diode voltage drops; that is, the voltage drop across any one of diodes CR1, CR3 and CR5 plus the voltage drop across diode CR8. This is applied to the minus (−) input of each of comparison amplifiers A4, A6 and A8.

It is possible to obtain AGC feedback by connecting the output of voltage follower amplifier A2, which comprises a DC voltage proportional to the maximum peak output voltage of any of tuned amplifiers A3, A5 or A7 (less its associated diode voltage drop as explained above) to AGC feedback lamps L1 and L2. It is particularly advantageous that lamps L1 and L2 comprise incandescent lamps having associated light dependent resistors R5 and R6 in the AGC feedback path because this combination provides linear amplifier performance, high feedback gain, excellent reliability, long life and low component cost. Other techniques may be employed to obtain the desired performance such as the substitution of field effect transistors (FET) therefor.

Light dependent resistors R5 and R6 provide excellent linearity as a function of the voltage drop thereacross. By controlling the resistance of LDR's R5 and R6 according to the amount of light to which they are exposed, the gain of amplifier A1 can be made adjustable without seriously influencing its linearity. It is essential that amplifier A1 function in the steady-state condition in the linear mode as otherwise, in the presence of a complex input signal, the desired frequency to be selected could be seriously distorted by a large signal outside the selection band, thus making reliable frequency selection difficult.

Incandescent lamps are particularly advantageous for use as the feedback light sources because of the following characteristics:

1—Relatively low power consumption.
2—Voltage and current range compatible with operational amplifier outputs.
3—Excellent reliability at the intended operating point.
4—Excellent life at the intended operating point.
5—Relatively low cost.
6—Thermal inertia provides ripple filtering, improving amplifier linearity.
7—High exponential relation between light output and applied voltage provides high loop gain for excellent automatic gain control (AGC).
8—High operating temperature of filament insures good stability as a function of ambient temperature.

However, it is apparent that other type light sources may be substituted for the incandescent lamps disclosed.

Lamp L2 is connected to the output of amplifier A2. The output of amplifier A2 is zero in the absence of an input and is positive in value when an input at one of the three selected frequencies $f_1$, $f_2$ or $f_3$ respectively exists. Once such an input at frequency $f_1$, $f_2$ or $f_3$ is applied to amplifier A2, lamp L2 is illuminated. Lamp L1 is connected between the output of amplifier A2 and a positive bias developed at the emitter of transistor Q1 which is connected to function as an emitter follower. Therefore, lamp L1 is lit in the absence of an input signal to amplifier A2 but its illumination decreases when a positive output is developed at amplifier A2. Resistor R9 is connected between the collector and base of transistor Q1, and resistor R10 is connected between the base of transistor Q1 and ground. They perform conventional emitter follower functions.

The use of incandescent lamps L1 and L2 in combination with light dependent resistors R6 and R5 respectively provides a high gain feedback system wherein the ratio of changes in the resistance of the light dependent resistor to changes in the voltage developed in their associated lamps, that is, $dR/_{R}/dV/_{V}$, assumes a large value as compared with other conversion techniques of comparable simplicity. This high conversion efficiency results in lamp voltage stability over a large range of input voltage. Thus good AGC action, or excellent output amplitude stability as a function of input amplitude variation, is effected. Further, the use of two light dependent resistors with two light sources provides advantages over the use of a single light source and light dependent resistor combinations. These are:

1—A substantial improvement in conversion gain is realized thus producing superior AGC action.
2—A significant improvement in transient response is realized.

Light dependent resistors typically display a somewhat slow response to changes in incident light. When illuminated, the resistance of a light dependent resistor does not assume the corresponding new low value of resistance instantaneously. The ability of a light dependent resistor to assume the resistance value corresponding to low or dark illumination thereof upon removal of the incident light source is also much lower than its response upon exposure to incident light. This results in a very unequal response time due to turn-on versus turn-off of the incident light. Such nonlinear performance would complicate the transient response of the closed loop system of amplifier A1 in the event that a single lamp and light dependent resistor combination were employed. The invention, however, by employing a tuned system of two lamps and two associated light dependent resistors provides the advantage that when one light source is increasing in illumination the other light source is decreasing in illumination. This characteristic thereof tends to balance out to thereby yield performance more linear with time.

As discussed above, the finite speed of response of a light dependent resistor provides a lag time in the closed looped system of amplifier A1. Lamps L1 and L2, because of thermal inertia, provide a second lag time in the system. Other less significant lag times are existent in the system with the result that if the open loop AGC gain of amplifier A1 is excessive, the system will be unstable in the closed loop system. Care must, therefore, be taken to isolate the system lag times adequately to insure stability and adequate speed of response.

The system described according to the invention functions to keep the tuned amplifier outputs (A3, A5 and A7) linear and constant within less than 3 db while the input amplitude varies over a range greater than 30 db. Obviously signals appearing at the outputs of tuned amplifiers which are tuned to frequencies other than that of the input signals will be significantly less than at the amplifier tuned to receive the input signals. Since the maximum tuned amplifier output at the selected frequency to be detected is the largest signal, but is not necessarily constant in amplitude, it is necessary to positively identify this selected frequency in the presence of other outputs which can be of any magnitude except they would be significantly lower in amplitude than the selected frequency.

Diodes CR1, CR3 and CR5 feed capacitor C3, the peak holding capacitor, and resistor R7, the discharge resistor of capacitor C3 which is returned to ground. Diodes CR2, CR4 and CR6 are respectively connected to the outputs of amplifiers A3, A5 and A7. These diodes feed peak holding capacitors C4, C5 and C6 respectively, having discharge resistors R11, R12 and R13. The return path for discharge resistors R11, R12 and R13 comprises a common connection C− that provides a small negative bias source for the resistors.

Amplifiers A4, A6 and A8 comprise differential operational amplifiers having good common-mode rejection, low offset voltage and current, and reasonably high gain. They are utilized in the open loop configuration and their outputs are normally saturated at the plus (+) or minus (−) limits depending upon the polarity of the difference in their input voltages. The minus (−) inputs are fed from the common source at the cathode of diode CR8 and assumes a voltage magnitude equal to the maximum peak voltage value at any of the outputs of amplifiers A3, A5 and A7, less the two associated diode voltage drops discussed above (voltage drops across either one of diodes CR1, CR3 or CR5 in addition to the voltage drop across diode CR8). This voltage is zero in the absence of an input signal because at that time no voltage exists to forward bias these diodes.

The plus (+) inputs to comparison amplifiers A4, A6 and A8 are respectively connected to the outputs of amplifiers A3, A5 and A7 through diodes CR2, CR4 and CR6. The plus (+) input to amplifier 4 thereby assumes a DC voltage equal to the peak voltage output of tuned amplifier A3, less the voltage drop across diode CR2. Similarly, amplifier A6 is fed from amplifier A5 through diode CR4 and amplifier A8 is fed from amplifier A7 through diode CR6. In the absence of an input signal, the plus (+) inputs of comparison amplifiers A4, A6 and A8 assume a voltage of substantially C minus. Further, in the absence of an input signal as described above, all minus (−) inputs of comparison amplifiers A4, A6 and A8 are biased at 0 volt and therefore the outputs of all comparison amplifiers will be operating at the minus (−) saturation level.

Assume a signal of frequency $f_1$ is applied to the input of the system. A large signal of stabilized amplitude resulting from the AGC amplifier A1 circuit will therefore exist at the output of tuned amplifier A3 and smaller signals will exist at the outputs of tuned amplifiers A5 and A7. A positive voltage equal to the peak value of the positive voltage produced by amplifier A3, less the voltage drop across diode CR2, will therefore be applied to the plus (+) input of amplifier A4, while a positive voltage equal to the peak positive voltage value of amplifier A3, less the voltage drops across diodes CR1 and CR8, will be applied to the minus (−) input of amplifier A4. Therefore a differential input equal to the voltage drop across one diode will exist in the input to amplifier A4, such that the plus (+) input is more positive than the minus (−) input, and a positive saturation output will be produced at the output of amplifier A4. It is necessary that the selectivity of amplifiers A5 and A7 be sufficient such that in the presence of any practicable input signal, which must exclude pure tones of frequencies $f_2$ and $f_3$, the peak voltage outputs of amplifiers A5 and A7 must be at least one diode voltage drop (approximately 0.6 volt) less than the peak output voltage of amplifier A3. This condition is not difficult to realize in applicant's circuit. Under the above condition, minus (−) inputs to amplifiers A6 and A8 are more positive than their plus (+) inputs. Accordingly, the outputs of amplifiers A6 and A8 remain at minus (−) saturation, just as in the case wherein zero signal is applied to the input of the system.

Resistors R15 and R16 are respectively connected at the minus (−) and plus (+) inputs to amplifier A4. Similarly, resistors R17 and R18 are associated with amplifier A6 and resistors R19 and R20 are associated with amplifier A8.

Transistors Q2, Q3 and Q4 comprise NPN transistors and function as output buffers for the multifrequency signal detector. Transistors Q2, Q3 and Q4 are respectively connected through resistors R21, R22 and R23 to the outputs of amplifiers A4, A6 and A8. Resistors R21 through R23 comprise current limiting resistors which are connected between the output of their respective associated comparison amplifier (A4, A6 or A8) and the base of their associated output buffer (Q2, Q3 or Q4). The output buffers are in turn connected to the following digital logic circuitry (not shown because it is not essential for an understanding of the multifrequency signal detector of the invention) and derives its power therefrom. Resistors R24, R25 and R26 comprise the collector load resistors for their respective transistors Q2, Q3 and Q4.

In the absence of signals of one of the frequencies selected to be detected by the detector ($f_1$, $f_2$ and $f_3$), the inputs to output buffers Q2, Q3 and Q4 are negative and therefore they do not conduct. However, when signals of the desired frequency selected to be detected are applied to the input of amplifier A1, the associated buffer is driven to the conducting state. For example, if signal frequency $f_1$ is applied to the input of amplifier A1, a positive output is produced by amplifier A4 as discussed above. This drives the associated output buffer to conduction. Thus, according to the example described above, transistor Q2 is driven into conduction while transistors Q3 and Q4 are maintained in their non-conducting states. Therefore a zero output is produced at transistor Q2 and this indicates that a signal of frequency $f_1$ is being applied to the input of amplifier A1. When signals of frequencies $f_2$ or $f_3$ are substituted, output buffers Q3 or Q4 will provide a corresponding indication.

Only one detector is shown in the figure. It of course is designed to selectively distinguish between the high-band of frequencies described in relation to the two-tone system of signaling. An associated second detector would normally be connected in parallel with the shown detector to selectively distinguish frequencies in the low-band. Obviously, depending upon the signaling system employed, the number of filter-amplifier networks provided can be varied to accommodate the particular system used.

I claim:

1. A multifrequency signal detector system to detect signals at different predetermined frequencies comprising:
amplifier input means to receive signals applied thereto,
a plurality of first amplifier means connected to the output of the amplifier input means, each of the first amplifier means being operative to produce a peak voltage output in response to receipt of signals at the associated predetermined frequency which is different for each of the plurality of first amplifier means,
feedback means having linear resistance characteristics operative to control the automatic gain control of the amplifier input means to stabilize signals at the predetermined frequency being detected,
a plurality of comparison amplifiers connected to each of the plurality of first amplifier means and to the feedback means to provide a signal indicative of receipt of signals at the predetermined frequency being detected.

2. A multifrequency signal detector system as recited in claim 1 further comprising:
a plurality of switch means, individual ones thereof being connected to corresponding outputs of the comparison amplifiers and responsive to receipt of signals at the predetermined frequency being detected to provide a corresponding output signal indicative of receipt thereof.

3. A multifrequency signal detector system as recited in claim 1 wherein the amplifier input means comprises an inverting amplifier functioning as a wide-band linear automatic gain control amplifier.

4. A multifrequency signal detector system as recited in claim 1 wherein the plurality of first amplifier means each comprises associated filter networks to pass the associated predetermined frequency.

5. A multifrequency signal detector system as recited in claim 1 wherein the feedback means comprises a voltage follower coupled between a common output of the first amplifier means and the amplifier input means.

6. A multifrequency signal detector system as recited in claim 5 wherein at least one light source is connected to the output of the voltage follower,
at least one light dependent resistor connected in the feedback circuit of the amplifier input means and operatively controlled by said at least one light source to provide automatic gain control for the amplifier input means.

7. A multifrequency signal detector system as recited in claim 6 wherein two light sources are connected to the output of the voltage follower and two operatively associated light dependent resistors are connected in the feedback circuit of the amplifier input means to balance out undesired non-linear operating characteristics of the light sources.

8. A multifrequency signal detector system as recited in claim 7 further comprising:
peak detection means responsive to that one of the plurality of first amplifier means receiving signals at its associated predetermined frequency to operatively bias the feedback means.

9. A multifrequency signal detector system as recited in claim 8 wherein the plurality of comparison amplifiers are connected to operate as differential amplifiers that produce a voltage depending upon the difference in voltages applied thereto by the associated first amplifier means and the output of the voltage follower.

10. A multifrequency signal detector system as recited in claim 5 wherein the plurality of comparison amplifiers are connected to operate as differential amplifiers that produce a voltage depending upon the difference in voltages applied thereto by the associated first amplifier means and the output of the voltage follower.

11. A multifrequency signal detector system as recited in claim 5 further comprising:
peak detection means responsive to that one of the plurality of first amplifier means receiving signals at its associated predetermined frequency to operatively bias the voltage follower.

12. A multifrequency signal detector system as recited in claim 11 wherein the output of the voltage follower is connected to a common first input of the plurality of comparison amplifiers and the outputs of each of the first amplifier means is connected to a second input of the associated comparison amplifier.

13. A multifrequency signal detector system as recited in claim 12 wherein the plurality of comparison amplifiers comprise differential amplifiers.

14. A multifrequency signal detector system as recited in claim 1 wherein the plurality of comparison amplifiers comprise differential amplifiers.

References Cited

UNITED STATES PATENTS 3,150,327 9/1964 Taylor ------------- 330—126

ROY LAKE, Primary Examiner

J. B. MULLINS, Assistant Examiner

U.S. Cl. X.R.

307—233; 328—105, 153, 167; 330—86